(12) United States Patent
Priest-Dorman et al.

(10) Patent No.: US 8,803,831 B1
(45) Date of Patent: Aug. 12, 2014

(54) CHORDING SHEATH FOR COMPUTING DEVICE

(75) Inventors: Greg Ellis Priest-Dorman, Berkeley, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 152 days.

(21) Appl. No.: 13/428,130

(22) Filed: Mar. 23, 2012

(51) Int. Cl.
*G06F 3/041* (2006.01)

(52) U.S. Cl.
USPC .......................................... 345/173; 345/156

(58) Field of Classification Search
CPC .................. G06F 3/04883; G06F 2203/04808; G06F 3/0235; G06F 3/0412; G06F 3/044; G06F 3/0488; G06F 3/041; G06F 3/04886; G06F 2203/04101; G06F 2203/04104; G06F 3/04815; G06F 3/04845; G06F 3/0485
USPC .......................................... 345/156, 173–181
See application file for complete search history.

(56) References Cited

U.S. PATENT DOCUMENTS

| | | | |
|---|---|---|---|
| 5,432,510 A | | 7/1995 | Matthews |
| 5,515,305 A | * | 5/1996 | Register et al. ................ 708/145 |
| 6,671,170 B2 | * | 12/2003 | Webb et al. .............. 361/679.09 |
| 6,947,028 B2 | * | 9/2005 | Shkolnikov .................... 345/156 |
| 7,782,307 B2 | | 8/2010 | Westerman et al. |
| 2008/0036743 A1 | | 2/2008 | Westerman et al. |
| 2009/0143142 A1 | * | 6/2009 | Marcus et al. .................. 463/37 |
| 2011/0215954 A1 | * | 9/2011 | Page .............................. 341/22 |

FOREIGN PATENT DOCUMENTS

WO 2010/077235 7/2010

OTHER PUBLICATIONS

Introducing the "Data Egg" [online], [retrieved on Mar. 22, 2012]. Retrieved from the Internet <URL: http://www.xaphoon.com/dataegg/>.
Everyday Usage Scenarios, Examples on how the Data Egg can be useful in real-world situations [online], [retrieved on Mar. 22, 2012]. Retrieved from the Internet <URL: http://www.xaphoon.com/dataegg/everyday_usage_scenarios.htm>.
Build a Chorder [online], [retrieved on Mar. 23, 2012]. Retrieved from the Internet <URL: http://chorder.cs.vassar.edu/spiffchorder/chorder_construction?s=sled>.

* cited by examiner

*Primary Examiner* — Duc Dinh
(74) *Attorney, Agent, or Firm* — McDonnell Boehnen Hulbert & Berghoff LLP

(57) ABSTRACT

A chording sheath device is disclosed. In one embodiment, the chording sheath device includes an outer shell configured to be removeably attached to a computing device, a plurality of input elements, and a plurality of mechanical elements in communication with the plurality of input elements. The mechanical elements are configured to press on a touch screen of the computing device in response to chorded input received on the input elements.

12 Claims, 2 Drawing Sheets

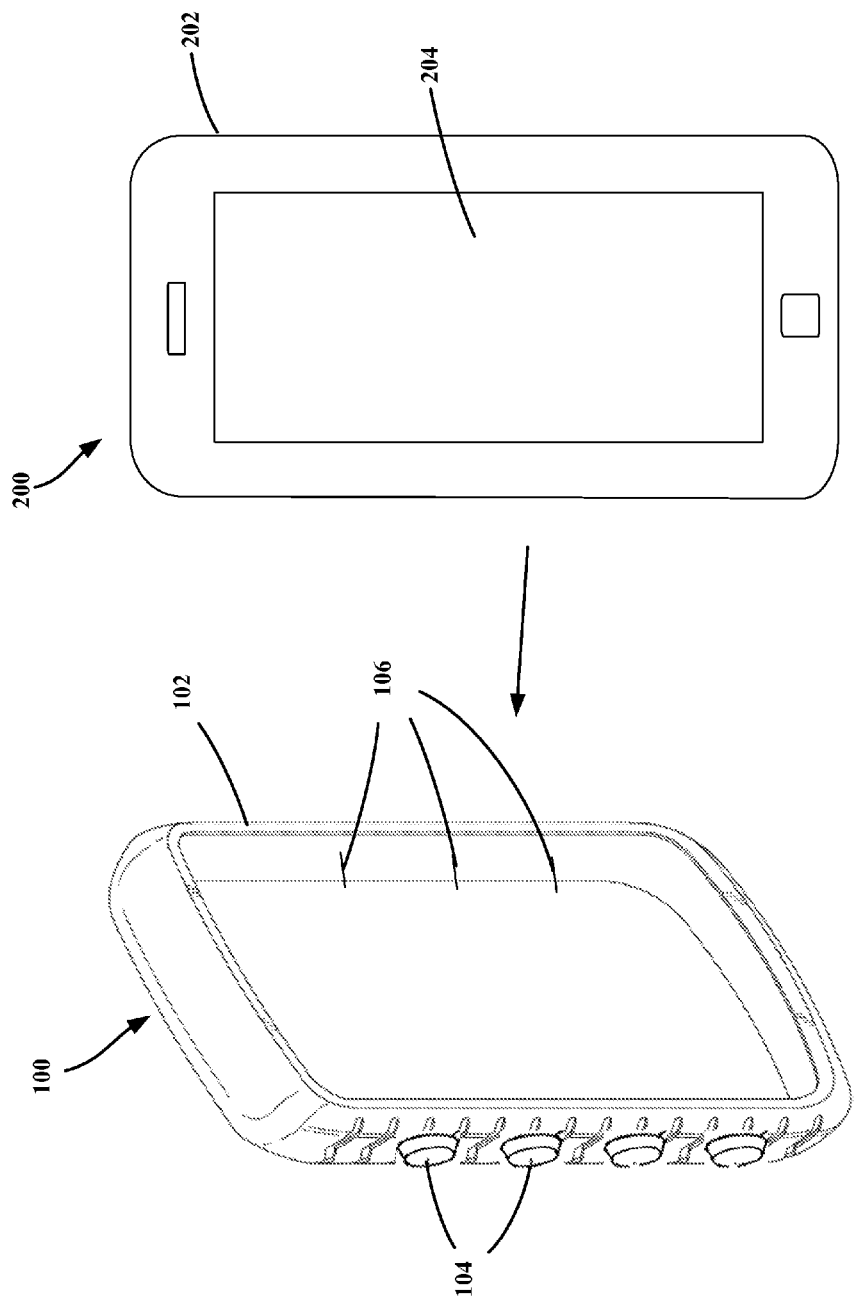

CHORDING SHEATH FOR COMPUTING DEVICE

BACKGROUND

Unless otherwise indicated herein, the materials described in this section are not prior art to the claims in this application and are not admitted to be prior art by inclusion in this section.

A chording keyboard or input device is known as a computer input device that allows a user to enter characters or commands formed by pressing several keys together, like playing a "chord" on a piano, to create chorded input.

In one design, the chording input device is a seven-button or key chorder, where one key is used for each of the index finger, middle finger, ring finger and pinky, and three keys for the thumb. The chorder can be used with either the left or right hand, or can be used for each hand, increasing typing speed.

These as well as other aspects, advantages, and alternatives, will become apparent to those of ordinary skill in the art by reading the following detailed description, with reference where appropriate to the accompanying drawings.

SUMMARY

In one embodiment, a sheath is provided for a computing device having an outer shell configured to be removeably attached to a computing device, a plurality of input elements, and a plurality of mechanical elements in communication with the plurality of input elements. The mechanical elements are configured to press on a touch screen of the computing device in response to chorded input received on the input elements.

In another embodiment, a system is provided. The system includes a computing device comprising a touch screen and a sheath removably attached to the computing device. The sheath includes a plurality of input elements associated with a plurality of contact locations on the touch screen, such that each input element is configured to convey a touch at a respective contact location in response to being activated. The computing device is configured to recognize input at the contact locations of the touch screen as chorded input.

In yet another embodiment, a system is provided including a mobile device having a touch screen and a sheath removably attached to the mobile device. The sheath includes a plurality of input elements associated with a plurality of contact locations on the touch screen, such that each input element includes a mechanical element that is configured to press against the touch screen at a respective contact location in response to the input element being activated. The mobile device includes software which enables the mobile device to recognize presses at the contact locations of the touch screen as chorded input.

In yet another embodiment, a sheath for a computing device is provided including an outer shell configured to be removeably attached to a computing device, and a plurality of input elements. The computing device includes software that enables the computing device to recognize chorded input, and the sheath communicates with the computing device using a wireless connection.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

Exemplary embodiments of the invention are described herein with reference to the drawings, in which:

FIG. 1 is a front perspective view of an example chording sheath device, in accordance with an embodiment;

FIG. 2 is a perspective view of an example computing device for use with the chording sheath device shown in FIG. 1.

DETAILED DESCRIPTION

Figure 3:
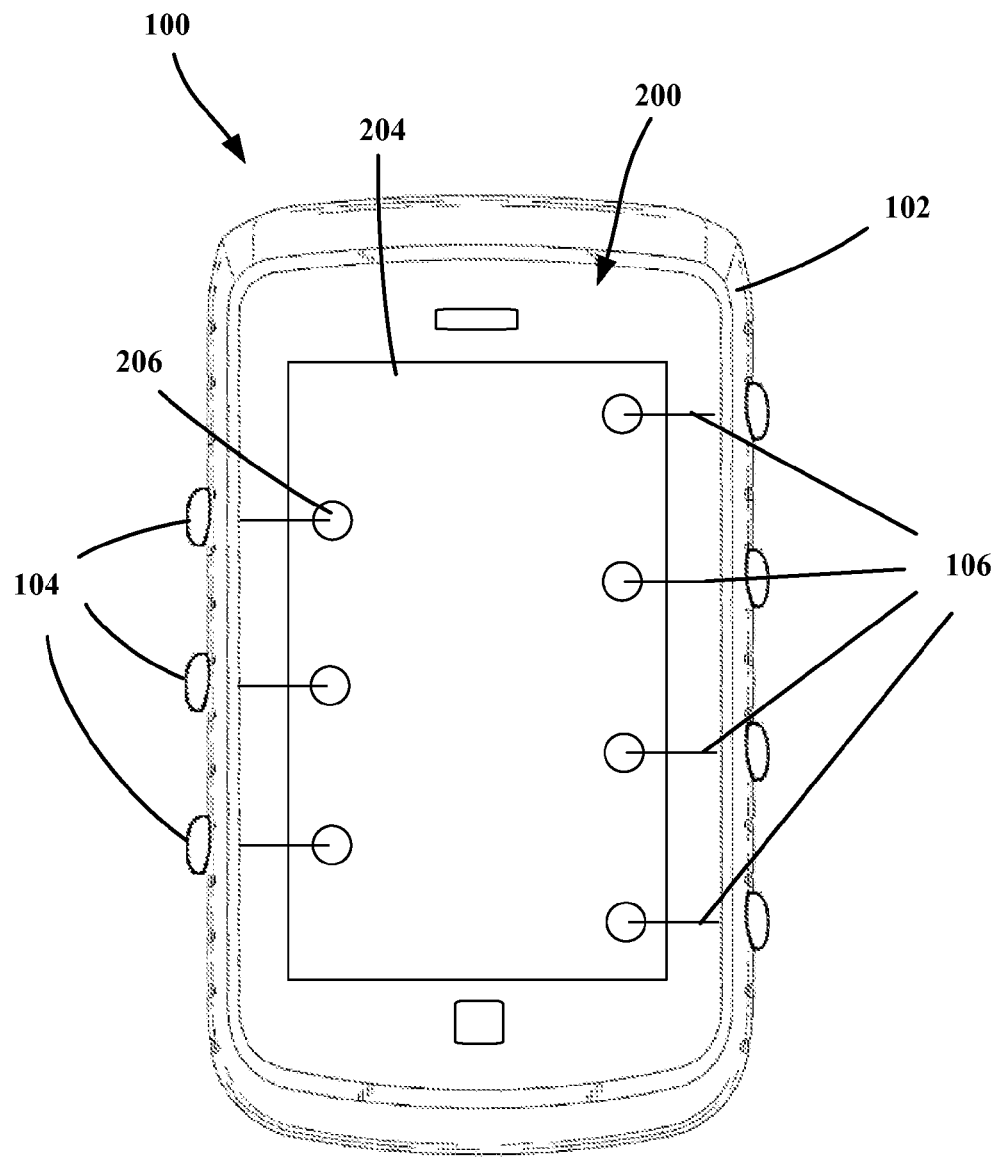
FIG. 3 illustrates a front view of a chording sheath device attached to a computing device.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

An exemplary embodiment of the application involves placing a sheath or cradle around a mobile device to provide the functionality of a chorded keyboard on the mobile device, while still allowing access to the surface of the screen of the device. In one embodiment, the sheath works mechanically. The sheath can create a seven-button or five-button chorded keyboard on the screen or edges of the mobile device. Software on the mobile device specifies the button locations on the touch screen. Activation of a location or input button or key on the sheath causes a corresponding location on the touch screen of the mobile device to be activated. The mobile device then recognizes chorded patterns of the buttons pressed and performs a specified function.

Turning now to the drawings, FIG. 1 shows an example chording sheath or sled 100. In one example, the chording sheath 100 may comprise an outer shell 102 that is configured to attach to an exterior of a computing device. The chording sheath 100 may be used with any type of device requiring input, such as a mobile phone, PDA, or other computing device, for example. The computing device may be configured to recognize chorded input, such as by including software, for example.

The chording sheath 100 may include a plurality of input elements 104 for receiving chorded input. Each input element is configured to convey a touch at a respective contact location in response to being activated. In examples, the touch is conveyed by one of a mechanical, an electrical, or a capacative input. The electrical conveyance may include a conductive thread or fabric, for example.

In one embodiment, the input elements 104 may include keys or buttons. Although the input elements 104 are shown as raised areas on the sheath, it should be understood that the input elements 104 may take any suitable form, such as, for example, a smooth surface on the chording sheath 100. Each key or button may be mapped to a number, and then can be mapped to a corresponding letter or command. As shown in FIG. 3, the chording sheath may include seven input elements 104. In this embodiment, four of the input elements 104 may be arranged on one side of the chording sheath 100 for use with fingers, and three input elements 104 may be arranged on the opposite side for use with a thumb. By pressing two or more keys together, a user can generate many combinations.

In another embodiment, the chording sheath may include five input elements 104. In that embodiment, four of the input elements 104 may be arranged on one side of the chording sheath 100 for use with fingers, and one input elements 104 may be arranged on the opposite side. Other possibilities exist as well.

The input elements 104 of the chording sheath 100 may each be in communication with a mechanical element 106. The mechanical elements 106 transmit signals to the computing device based on the chorded input received. In one example, the mechanical element 106 may be a needle or pin, for example, that when activated, presses against a touch screen of a computing device, such as computing device 200 shown in FIG. 2. In another embodiment, the mechanical element 106 may be wireless.

FIG. 2 shows an example computing device 200, such as a mobile phone, that may be used with the chorded sheath 100. When placed on the computing device 200, the sheath 100 may provide the computing device 200 with input elements 104 to recognize chorded input. The computing device 200 may further include software to allow the computing device to recognize chorded input. The software may be in the form of an application or "App," for example. In another embodiment, the computing device 200 may include hardware configured to recognize chorded input.

The sheath 100 may be placed around the computing device 200 to cover one or more sides 202 of the computing device. The computing device 200 includes a touch screen 204. The sheath 100 may contact the touch screen 204 without blocking a majority of the touch screen, so that much of the touch screen 204 can still be viewed when the sheath 100 is attached to the computing device 200.

Additionally or alternatively, the sheath 100 may communicate with the computing device 200 in a wired or wireless manner. For example, in one embodiment the sheath 100 may include a wired serial bus, such as a universal serial bus or a parallel bus, among other connections. In another example, the sheath 100 may communicate with the computing device 200 via a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well.

The computing device 200 may be any type of computing device or transmitter, such as, for example, a laptop computer, a mobile telephone, or a tablet computing device, etc., that is configured to transmit data.

In operation, the sheath 100 is placed onto a computing device, such as computing device 200. A user may then activate one or more of the input elements 104 on the sheath 100. In one example embodiment, the input elements 104 may be pressure sensitive. In this example, activation may occur by pressing on one or more of the input elements, to create chorded input. A finger or thumb of a user applies pressure to the input element, which moves in response to the pressure. In other examples, the input element may provide a clicking sound when pressure is applied. Thus, tactile, audio, and/or visual feedback is provided to the user as an indication that the input element 104 has been activated.

In another example embodiment, the input elements 104 may be formed as smooth surfaces and may respond to contact or partial contact by the user. In this embodiment, the activation may occur by touching, traveling, or hovering over one or more of the input elements 104. In one example, multiple levels of press can be used to create the chorded input. For instance, a soft touch may indicate a lower case letter and a harder touch may indicate an upper case letter.

When the input element 104 is activated, the corresponding mechanical element 106 may convey a contact location 206 on the touch screen 204 of the computing device 200. The computing device 200 is configured to recognize the input at the contact locations as chorded input, such as by including software. The computing device 200 may then perform the function associated with the received chorded input.

The circles in FIG. 3 are shown merely to point out the contact locations 206. The touch screen 204 may not necessarily display circles or any other shape at those points, although it is possible to do so.

While the invention has been described in connection with certain embodiments, it will be understood that it is not intended to limit the invention to those particular embodiments. On the contrary, it is intended to cover all alternatives modifications, and equivalents included within the spirit and scope of the invention as defined by the appended claims.

The invention claimed is:

1. A sheath for a computing device comprising:
an outer shell configured to be removeably attached to a computing device, wherein the outer shell includes a first side and a second side;
a plurality of input elements, wherein one or more input elements are arranged on the first side of the outer shell, and wherein one or more input elements are arranged on the second side of the outer shell; and
a plurality of mechanical elements physically connected to a corresponding input element of the plurality of input elements;
wherein the plurality of mechanical elements are configured to press on a contact location of a touch screen of the computing device in response to chorded input received on the input elements, and wherein the computing device includes software that enables the computing device to recognize chorded input.

2. The sheath of claim 1 wherein the input elements are pressure sensitive buttons that provide tactile feedback.

3. The sheath of claim 1 wherein the input elements are activated by partial contact.

4. The sheath of claim 1 further comprising four input elements arranged on the first side of the outer shell and three input elements arranged on the second side of the outer shell.

5. The sheath of claim 1 wherein the computing device includes hardware that enables the computing device to recognize chorded input.

6. The sheath of claim 1 wherein the computing device is a mobile device.

7. A system comprising:
a mobile device comprising a touch screen; and
a sheath removably attached to the mobile device including a first side and a second side, wherein the sheath includes a plurality of input elements associated with a plurality of contact locations on the touch screen, wherein one or more input elements are arranged on the first side of the sheath and one or more input elements are arranged on the second side of the sheath, and wherein each input element is physically connected to a corresponding mechanical element that is configured to press against the touch screen at a respective contact location in response to the input element being activated;
wherein the mobile device includes software which enables the mobile device to recognize presses at the contact locations of the touch screen as chorded input.

8. The system of claim 7 wherein the input elements are activated by presses, and the activation of the input elements provide feedback.

9. The system of claim 7 wherein the input elements are activated by contact or partial contact.

10. The system of claim 7 wherein the mechanical element comprises a pin.

11. The system of claim 7 further comprising four input elements arranged on the first side of the sheath and three input elements arranged on the second side of the sheath.

12. The system of claim 7 wherein the computing device includes hardware that enables the computing device to recognize chorded input.

* * * * *